United States Patent
Morard et al.

(10) Patent No.: US 11,269,700 B2
(45) Date of Patent: Mar. 8, 2022

(54) SYSTEM CALL INTERCEPTION FOR FILE PROVIDERS

(71) Applicant: Apple Inc., Cupertino, CA (US)

(72) Inventors: Jean-Gabriel Morard, Chaville (FR); Florent Bruneau, Carrières sous Poissy (FR); Dominic B. Giampaolo, Lewiston, ME (US); Henri Doreau, Nanterre (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/809,943

(22) Filed: Mar. 5, 2020

(65) Prior Publication Data
US 2020/0341827 A1   Oct. 29, 2020

Related U.S. Application Data

(60) Provisional application No. 62/837,339, filed on Apr. 23, 2019, provisional application No. 62/855,789, filed on May 31, 2019.

(51) Int. Cl.
*G06F 9/54* (2006.01)
*G06F 16/182* (2019.01)

(52) U.S. Cl.
CPC ............ *G06F 9/547* (2013.01); *G06F 16/182* (2019.01)

(58) Field of Classification Search
None
See application file for complete search history.

(56) References Cited

U.S. PATENT DOCUMENTS

| | | | | |
|---|---|---|---|---|
| 6,934,761 B1* | 8/2005 | Curtis | ............... | G06F 16/9574 709/237 |
| 2007/0223497 A1* | 9/2007 | Elson | ................ | G01D 9/005 370/400 |
| 2009/0216520 A1* | 8/2009 | Khan | .................. | G06F 9/4411 703/26 |
| 2012/0185518 A1* | 7/2012 | Giampaolo | ........... | H04L 9/3213 707/821 |
| 2012/0310880 A1 | 12/2012 | Giampaolo et al. | | |
| 2013/0055341 A1* | 2/2013 | Cooper | .............. | G06F 21/6281 726/1 |
| 2013/0311597 A1* | 11/2013 | Arrouye | ............... | G06F 9/5072 709/217 |

(Continued)

OTHER PUBLICATIONS

Draves et al. "MIG—The MACH Interface Generator" Nov. 1989 Carnegie-Mellon University pp. 1-22.*

*Primary Examiner* — Charles E Anya
(74) *Attorney, Agent, or Firm* — Dickinson Wright RLLP

(57) ABSTRACT

Representative embodiments set forth herein disclose techniques for enabling a local file system implemented on a computing device to interact with remote files that have not yet been synchronized to the local file system. According to some embodiments, a method can be implemented at the computing device, and include the steps of (1) receiving a system call directed to an operating system kernel to access a file stored on a remote server device, (2) invoking a fault handler in response to processing the system call, (3) generating a remote procedure call (RPC) associated with the user space application to store the file in a local file system implemented on the computing device, and (4) executing a callback function associated with the RPC when the file is stored in the local file system.

20 Claims, 10 Drawing Sheets

(56) References Cited

U.S. PATENT DOCUMENTS

| | | |
|---|---|---|
| 2013/0311598 A1 | 11/2013 | Arrouye et al. |
| 2013/0311986 A1 | 11/2013 | Arrouye et al. |
| 2016/0330256 A1* | 11/2016 | Novak .................. G06F 16/182 |
| 2017/0039218 A1* | 2/2017 | Prahlad ............... H04L 63/0428 |
| 2018/0307702 A1* | 10/2018 | Kube .................. G06F 16/1844 |
| 2018/0329905 A1* | 11/2018 | Christiansen ........... G06F 16/13 |

\* cited by examiner

300

| FILE PROVIDER DAEMON 116 |||
|---|---|---|
| ACCESS CONTROL TABLE 310 |||
| APPLICATION | ACCESS GRANTED | ITEM ID |
| COM.DOMAIN.WORD PROCESSING_APP | COM.VENDOR.APPLICATION | 57 |
| ⋮ | ⋮ | ⋮ |

SYSTEM CALL INTERCEPTION FOR FILE PROVIDERS

CROSS-REFERENCE TO RELATED APPLICATIONS

The present application claims the benefit of U.S. Provisional Application No. 62/837,339, entitled "SYSTEM CALL INTERCEPTION FOR FILE PROVIDERS," filed Apr. 23, 2019, and U.S. Provisional Application No. 62/855,789, entitled "SYSTEM CALL INTERCEPTION FOR FILE PROVIDERS," filed May 31, 2019, the contents of which are incorporated herein by reference in their entirety for all purposes.

FIELD

The described embodiments relate generally to cloud-based storage solutions. More particularly, the embodiments relate to extending a local file system to access remotely-stored files or directories.

BACKGROUND

Computing devices typically include one or more non-volatile memories such as solid-state drives, hard disc drives, and the like. A file system can be implemented for one or more volumes stored on a non-volatile memory of a computing device. However, because the storage capacity of the non-volatile memory typically is limited, a user often utilizes third-party cloud-based storage solutions to extend the storage resources that are available to the computing device.

In some cases, third-party storage providers—such as cloud storage services—provide applications that run in user space on the computing device and coordinate the synchronization of remote files with local copies of the files stored on the file system of the computing device. The user can make modifications to the local copies of the files, whereupon the applications propagate the changes to the remote files. However, the storage capacity of the cloud-based volume made available to the user can often exceed the available storage space on the computing device. Consequently, the third-party providers have recently made attempts to enable the user to interact with the remote files without having to sync all the data to the file system.

One technique for implementing this functionality is to use kernel extensions to intercept system calls at the file system level of the operating system kernel. The kernel extension then blocks system calls related to a remote file and issues a request to the application to synchronize (e.g., download) the remote file to the local file system. When the file is downloaded, the kernel unblocks the system call such that applications can interact with the local copy of the file.

Another technique is to utilize a third-party application as a plug-in that enables the third-party provider to write a file system that executes in user space to provide this functionality. Again, this plug-in also utilizes kernel extensions as a bridge between the local file system in the kernel and the third-party application.

Importantly, these solutions are undesirable because they interfere with system calls in kernel space. More specifically, access to kernel space functions introduces security vulnerabilities as well as opens the kernel to unexpected procedural differences in how different file providers handle file system faults.

Accordingly, what is desired is the ability to enable third-party file providers to provide user space application extensions that utilize high level code to handle enumeration requests and synchronization tasks associated with cloud-based storage solutions. In particular, it is desirable to implement such user space application extensions without interfering in kernel level system calls from other applications or tools.

SUMMARY

Representative embodiments set forth herein disclose techniques for enabling a local file system implemented on a computing device to interact with remote files that have not yet been synchronized to the local file system.

One embodiment sets forth a method for enabling a user space application to access files at a computing device. According to some embodiments, the method can be implemented at the computing device, and include the steps of (1) receiving a system call directed to an operating system kernel to access a file stored on a remote server device, (2) invoking a fault handler in response to processing the system call, (3) generating a remote procedure call (RPC) associated with the user space application to materialize the file in a local file system implemented on the computing device, and (4) executing a callback function associated with the RPC when the file is materialized in the local file system.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
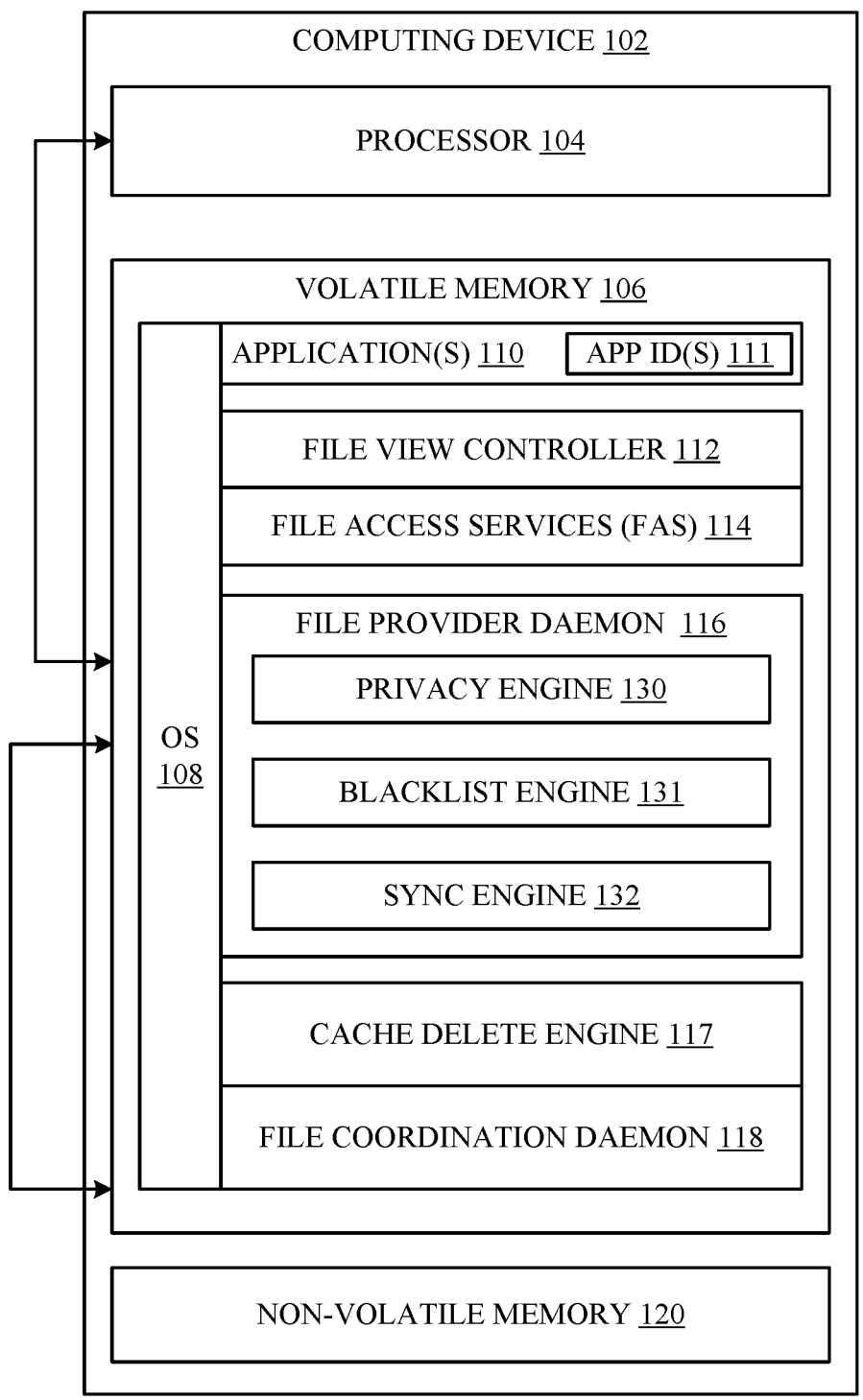
FIG. 1A illustrates a high-level overview of a computing device that can be configured to perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments can be practiced without some or all these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in enough detail to enable one skilled in the art to practice the described embodiments, it is understood that these examples are not limiting such that other embodiments can be used, and changes can be made without departing from the spirit and scope of the described embodiments.

The proposed techniques enable a local file system to interact with remote files that have not yet been synchronized to the local file system. Applications or tools can utilize full-feature support of the local file system when interacting with the remote files, and there is no performance impact when the files or directories have been materialized (i.e., stored) on the local file system. Furthermore, when the files or directories have been locally materialized, the applications or tools on the computing device are granted full offline access to the local copies of the files or directories.

In accordance with some embodiments, remote files or directories are materialized in the local file system using placeholder files (also referred to herein as "dataless faults"). The dataless faults do not store any data for the file, but at least some attributes related to the remote file or directory can be stored in metadata for the dataless fault. System calls made to the local file system for a dataless fault result in a failure that causes the local file system to invoke a namespace handler in user space whenever the data in the remote file is needed—e.g., to process read/write requests associated with the remote file. In turn, the namespace handler calls a file coordination daemon executing in user space, which issues a subsequent call to a file provider daemon to invoke the correct instance of a file access service. The file access service coordinates the synchronization task to download the data in the remote file to the local machine. In turn, the data—when available—is copied into the placeholder file. The metadata for the placeholder file is updated to indicate that the file is a local copy of the remote file, and the original system call unblocks allowing the application or tool to access the local copy of the file via the local file system.

Third-party file providers can provide respective file access service applications that execute in user space and are configured to handle enumeration and synchronization tasks associated with a corresponding cloud storage service. It will be appreciated that this technique does not require the third-party file providers to write kernel extensions or utilize third-party plug-ins to extend the local file system with the functionality described above. On the contrary, the above-described file coordination daemon—which executes in user space—is modified to handle faults generated by the local file system when files or directories that are not yet materialized are accessed by an application.

A more detailed description of the various techniques described herein, and the manner in which they can be implemented, is provided below in conjunction with FIGS. 1-6.

Figure 6:
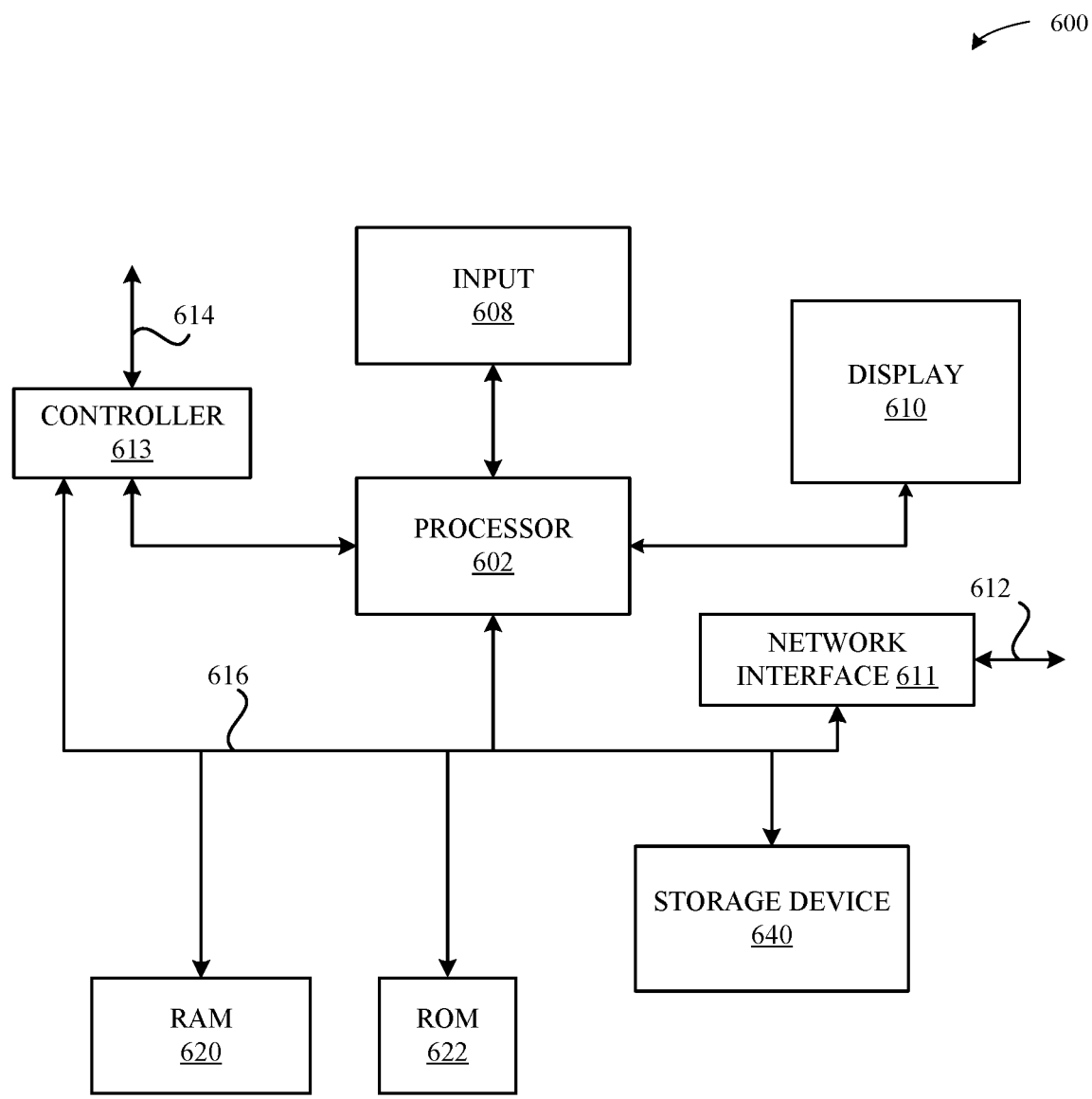
FIG. 6 illustrates a detailed view of a computing device that can represent the computing device of FIG. 1A used to implement the various techniques described herein, according to some embodiments.

FIG. 1A illustrates a high-level overview 100 of a computing device 102 that can be configured to perform the various techniques described herein. As shown in FIG. 1A, the computing device 102 can include a processor 104, a volatile memory 106 (e.g., a Random-Access Memory (RAM)), and a non-volatile memory 120 (e.g., a storage device). It is noted that a more detailed breakdown of example hardware components that can be included in the computing device 102 is illustrated in FIG. 6, and that these components are omitted from the illustration of FIG. 1A merely for simplification purposes. For example, the computing device 102 can include additional non-volatile memories (e.g., solid state drives, hard drives, etc.), other processors (e.g., a multi-core central processing unit (CPU)), and the like. According to some embodiments, an operating system (OS) 108 can be loaded into the volatile memory 106, where the OS 108 enables the execution of a variety of applications. The OS 108 and/or the applications executed within a runtime environment provided by the OS 108 enable the various techniques described herein to be implemented by the computing device 102. As described in greater detail herein, such applications can include an application 110, a file view controller 112, one or more file access services 114, a file provider daemon 116, a cache delete engine 117, and a file coordination daemon 118.

According to some embodiments, the file view controller 112 can represent a file browser that operates independently from a host application, such as an application 110, and includes the functionality to generate user interfaces. It is noted that each application 110 can be associated with an application ID 111 that, as described in further detail below, can enable different file access services 114 to identify the application 110 (when the file access services 114 are permitted to do so). For example, a user interface generated by the file view controller 112 can be actively presented to a user via a display device (not illustrated in FIG. 1A) that is communicably coupled to the computing device 102. As described in greater detail herein, a user interface generated by the file view controller 112 can include several user interface (UI) objects such as buttons, menus, icons, and the like. Each UI object can be configured to cause the file view controller 112 to display, upon selection, one or more relevant files/folders to a user. A file can include any combination of data for documents, spreadsheets, presentations, messages, text, video, audio, images, and the like. A directory is a hierarchical construct that contains a collection of files and/or sub-directories in relation to the hierarchy.

The directory hierarchy can be associated with a root directory for a volume stored in the non-volatile memory 120.

It will be appreciated that the files and/or directories can be associated with a file system. The file system is a construct that defines how data is stored in the non-volatile memory and provides mechanisms to access and/or modify the data. Modern file systems implement various features such as full disk encryption, file encryption, extended naming conventions, access control lists, compression, and the like. Examples of file systems that can be implemented within computing device 102 include Apple File System (APFS), Hierarchical File System (HFS), HFS Plus (HFS+), New Technology File System (NTFS), Extended File System (ext), and the like.

According to some embodiments, each file access service 114 can provide access to a particular file system, e.g., a local file system, a network file system, a cloud-based file system, and the like. As described in greater detail herein, each file access service 114 can perform enumeration and/or synchronization procedures, using enumeration logic, for a set of files within the domain of the file access service 114. Each file access service 114 can also communicate data related to an active set of files identified by the file provider daemon 116 and associated with the corresponding file system. As described in greater detail herein, each file access service 114 can also assist the file provider daemon 116 in providing the file view controller 112 with updated versions of relevant files for display to a user.

According to some embodiments, the file provider daemon 116 can perform synchronization/enumeration procedures, using enumeration logic, to monitor enumerated files included in one or more volumes associated with one or more file systems, both local and remote. Furthermore, as described in greater detail herein, the file provider daemon 116 can communicate with different file access services 114 that provide various user space file systems that interface with a native kernel space file system and enable volumes utilizing different file systems to be mounted by the OS 108. In this fashion, the file provider daemon 116 can manage calls to access or modify various files or directories in the various volumes mounted by the OS 108 of the computing device 102. As shown in FIG. 1A, the file provider daemon 116 can be configured to implement a privacy engine 130, a blacklist engine 131, and a synchronization engine 132, which can provide additional features that are discussed below in greater detail in conjunction with FIGS. 1B, 1C, 1D, and 1E, respectively.

Additionally, and according to some embodiments, the cache delete engine 117 includes the functionality to free up storage space on the non-volatile memory 120. According to some embodiments, the cache delete engine 117 can proactively manage storage space on the non-volatile memory 120. For example, the cache delete engine 117 can analyze content stored on the non-volatile memory 120 to identify files that are infrequently accessed and that can be recovered from another storage (e.g., a cloud storage service), and purge such files from the non-volatile memory 120 to free up storage space. According to some embodiments, the cache delete engine 117 can reactively manage storage space on the non-volatile memory 120, e.g., when the computing device 102 is tasked with storing data and there is not enough free storage space within the non-volatile memory 120 to store the data. In any case, the cache delete engine 117 represents an entity that is responsible for and capable of deleting data from the non-volatile memory 120 in accordance with policies that are implemented by the computing device 102 itself, the file access services 114, etc., to enable the computing device 102 to operate in an expected manner.

Additionally, and according to some embodiments, the file coordination daemon 118 includes the functionality to orchestrate read/write access to files associated with the file access services 114 in accordance with selections of files made within the file view controller 112 or accessed via a root file system implemented by a kernel of the OS 108. For instance, file coordination daemon 118—with the assistance of file provider daemon 116—can perform validation procedures that ensure only an authorized application can access a file. Additionally, file coordination daemon 118 can engage in cooperative communications with several different applications so that any application that seeks to access a selected file can receive an up-to-date version of the selected file—or, in some cases, prevent an open file currently being accessed by one application from being concurrently accessed by another application. In other words, the file coordination daemon can manage the sharing of files among multiple applications on the computing device 102 and/or among multiple computing devices 102 that share access to a file over a network.

Figure 1B:
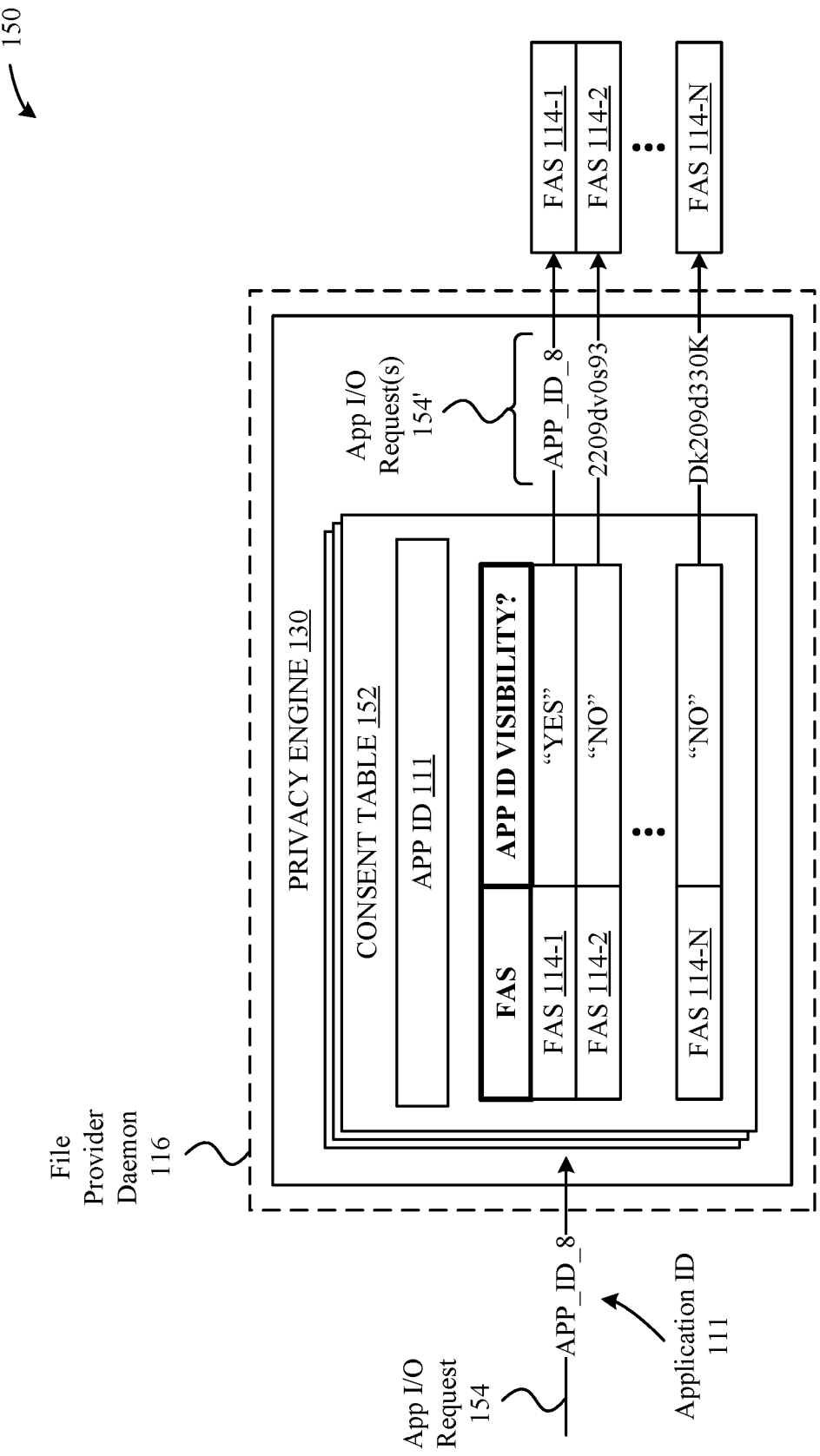
FIG. 1B illustrates a detailed overview of a privacy engine that can be implemented on the computing device of FIG. 1A, according to some embodiments.

FIG. 1B illustrates a detailed overview 150 of the privacy engine 130 that can be implemented by the file provider daemon 116, according to some embodiments. As described in greater detail herein, the privacy engine 130 can be configured to enable a user to specify whether different file access services 114 are permitted (or are not permitted) to identify applications 110 that issue requests to the file access services 114.

According to some embodiments, when an application 110 makes an initial attempt to interface with a given file access service 114, the computing device 102 can prompt a user of the computing device 102 to obtain the user's preference as to whether the file access service 114 should be permitted to identify the application 110 (e.g., when the application 110 issues I/O requests associated with the file access service 114). To manage the user's preferences, the privacy engine 130 can be configured to implement, for each application 110 on the computing device 102, a respective consent table 152. According to some embodiments, each consent table 152 can be associated with an application ID 111 that correlates the consent table 152 to the application 110 having the application ID 111. Additionally, and as illustrated in FIG. 1B, each consent table 152 can implement a data structure that identifies file access services 114 that are permitted (or are not permitted) to view the application ID 111 of the application 110 to which the consent table 152 corresponds when the application 110 issues requests directed to the file access services 114. It is noted that the data structure illustrated in FIG. 1B is exemplary, and that other suitable approaches can be utilized to manage whether file access services 114 are permitted to view the application IDs 111 of the applications 110. For example, the privacy engine 130 can instead maintain a consent table 152 for each file access service 114, where each consent table 152 includes a data structure that identifies application IDs 111 of applications 110 and whether the file access service 114 is permitted to view them.

In any case, the privacy engine 130 can utilize the consent tables 152 to identify, when a given application 110 issues a request associated with a given file access service 114, whether the file access service 114 is permitted to (1) view the application ID 111 associated with the application 110 (thereby effectively enabling the file access service 114 to understand which application 110 is issuing the request)—or, (2) view only a universal unique identifier associated with the application 110 (thereby effectively preventing the file access service 114 from deriving information about the application 110 that is issuing the request). According to some embodiments, the universal unique identifier can be implemented using any technique that makes it difficult for a given file access service 114 to identify the application ID 111 of the application 110 that issues I/O requests. For example, the universal unique identifier can be a randomly-generated value that is periodically refreshed. For example, a universal unique identifier can be randomly generated and assigned to each I/O request that the privacy engine 130 forwards to file access services 114 that are prohibited from viewing application IDs 111. This approach makes it virtually impossible for such file access services 114 to determine which underlying applications 110 are issuing the I/O requests. Moreover, this approach makes it virtually impossible for multiple file access services 114 to communicate information between one another in attempt to identify correlations between the universal unique identifiers and their corresponding applications 110.

An example scenario is provided in FIG. 1B to further-illustrate the foregoing techniques. In particular, and as shown in FIG. 1B, an I/O request 154 can be issued from an application 110 having the application ID 111 "APP_ID_8". In a first scenario, the I/O request 154 is directed to a file access service 114-1, which has been permitted by the user (e.g., through the prompt described above) to view the application ID 111 associated with the application 110. In this first scenario, the privacy engine 130 identifies that the file access service 114-1 is permitted to view the application ID 111, and, in turn, the privacy engine 130 forwards the I/O request 154 to the file access service 114-1 (denoted by the corresponding I/O request 154'). In a second scenario, the I/O request 154 is directed to a file access service 114-2 that has been prohibited by the user to view the application ID 111 associated with the application 110. In this scenario, the privacy engine 130 identifies the prohibition, and effectively scrubs the application ID 111 from the I/O request 154 and replaces it with the universal unique identifier "2209dv0s93". In a third scenario, the I/O request 154 is directed to a file access service 114-3 that has been prohibited by the user to view the application ID 111 associated with the application 110. In this scenario, the privacy engine 130 identifies the prohibition, and effectively scrubs the application ID 111 from the I/O request 154 and replaces it with the universal unique identifier "Dk209d330K".

Accordingly, the privacy engine 130 can be configured to enable a user to specify whether different file access services 114 are permitted (or are not permitted) to identify applications 110 that issue requests to the file access services 114. Additionally, and according to some embodiments, the file provider daemon 116—specifically, the blacklist engine 131—can be configured to honor requests by file access services 114 to outright prohibit applications 110 (or other processes) executing on the computing device 102 from attempting to access data that is managed by the file access services 114.

Figure 1C:
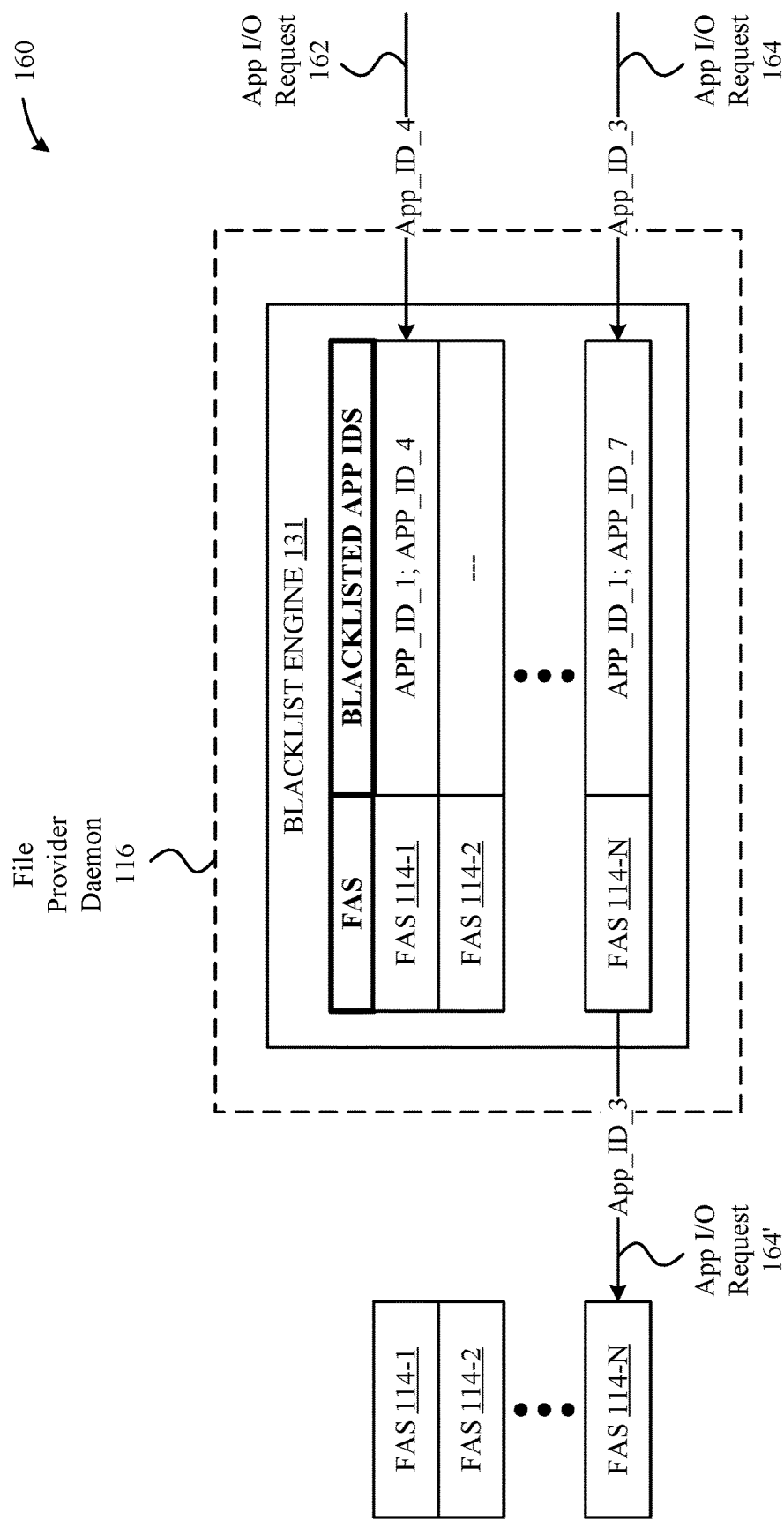
FIG. 1C illustrates a detailed overview of a blacklist engine that can be implemented on the computing device of FIG. 1A, according to some embodiments.

FIG. 1C illustrates a detailed overview 160 of the blacklist engine 131, according to some embodiments. As shown in FIG. 1C, the blacklist engine 131 can be configured to implement a data structure that identifies, for each file access service 114, (zero or more) application IDs 111 (of applications 110) that have been blacklisted by the file access service 114. In accordance with the example scenario illustrated in FIG. 1C, the file access service 114-1 has blacklisted the applications 110 associated with the application IDs 111 "APP_ID_1" and "APP_ID_4", such that these applications 110 are prohibited from interfacing with the file access service 114-1. For example, as shown in FIG. 1C, a I/O request 162 is issued to the file access service 114-1 by the application 110 having the application ID 111 "App_ID_4", which is included in the blacklist provided by the file access service 114-1. In this example, the I/O request 162 is blocked by the blacklist engine 131 and is not forwarded to the file access service 114-1.

Continuing with the example scenario illustrated in FIG. 1C, the file access service 114-2 has not blacklisted any of the applications 110, such that any application 110 is free to interface with the file access service 114-2. Additionally, and continuing with the example scenario illustrated in FIG. 1C, the file access service 114-N has blacklisted the applications 110 associated with the application IDs 111 "APP_ID_1" and "APP_ID_7", such that these applications 110 are prohibited from interfacing with the file access service 114-N. In this regard, and in the example illustrated in FIG. 1C, an I/O request 164 is issued to the file access service 114-N by the application 110 having the application ID 111 "App_ID_3", which is not included in the blacklist provided by the file access service 114-N. In this regard, the I/O request 164 is not blocked by the blacklist engine 131 and is forwarded to the file access service 114-N (in the form of a I/O request 164').

It is noted that additional information about other processes can be included in the data structure, such as process names, process types, etc., that effectively enable the file access services 114 to further-define which processes are prohibited from interfacing with the file access services 114. In any case, the blacklist engine 131 can be configured to, when appropriate, prevent I/O requests from being forwarded to the file access services 114, thereby honoring whatever blacklists are provided by the file access services 114.

Figure 4:
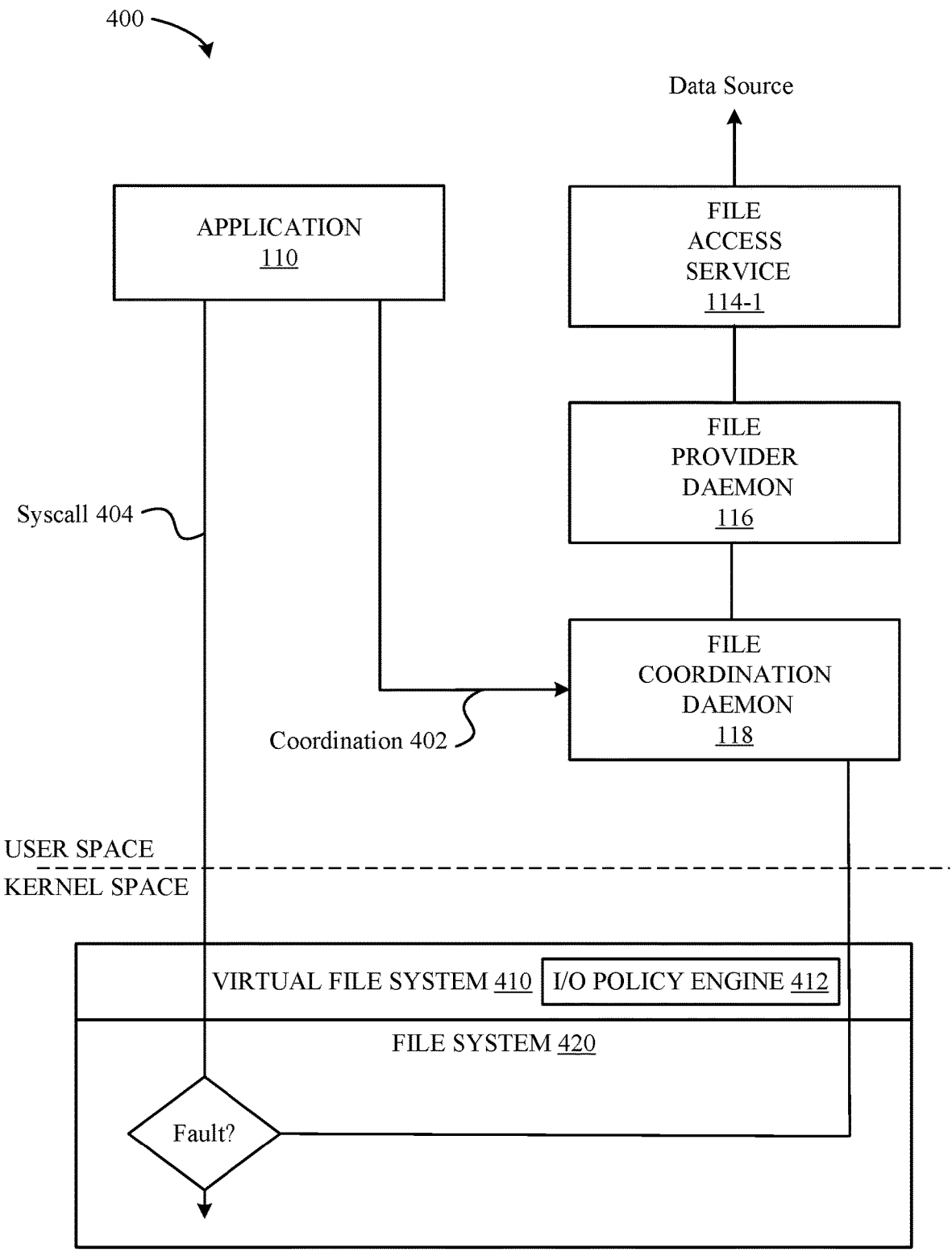
FIG. 4 illustrates coordination procedures to facilitate file access by multiple clients, in accordance with some embodiments.

Additionally, and although not illustrated in FIG. 1C, it is noted that other engines can be implemented to control the manner in which applications 110 are permitted to access file access services 114. For example, an I/O policy engine 412—which is illustrated in FIG. 4—can be implemented in kernel space to enforce system-wide restrictions. For example, a particular policy implemented by the I/O policy engine 412 can permit applications 110 (e.g., user-installed apps) to access the file access services 114, but prohibit daemons from accessing the file access services 114 (e.g., virus scanners). In another example, a particular policy implemented by the I/O policy engine 412 can permit both applications 110 and daemons to access the file access services 114. It is noted that in both these scenarios, the additional enforcement techniques described herein can modify the manner in which the applications 110/daemons are ultimately permitted to interface with the file access services 114. For example, even where a policy implemented by the I/O policy engine 412 permits applications 110 to interface with a given file access service 114, one or more of the applications 110 may have been blacklisted by the file access service 114, thereby preventing them from interfacing with the file access service 114.

Accordingly, FIGS. 1B-1C—as well as FIG. 4—set forth a privacy engine 130, a blacklist engine 131, and an I/O policy engine 412 that can be used not only to control the manner in which the applications 110/daemons and the file access services 114 interface with one another, but also to control the level of information that is exposed between them (i.e., revealing application IDs 111).

Figure 1D:
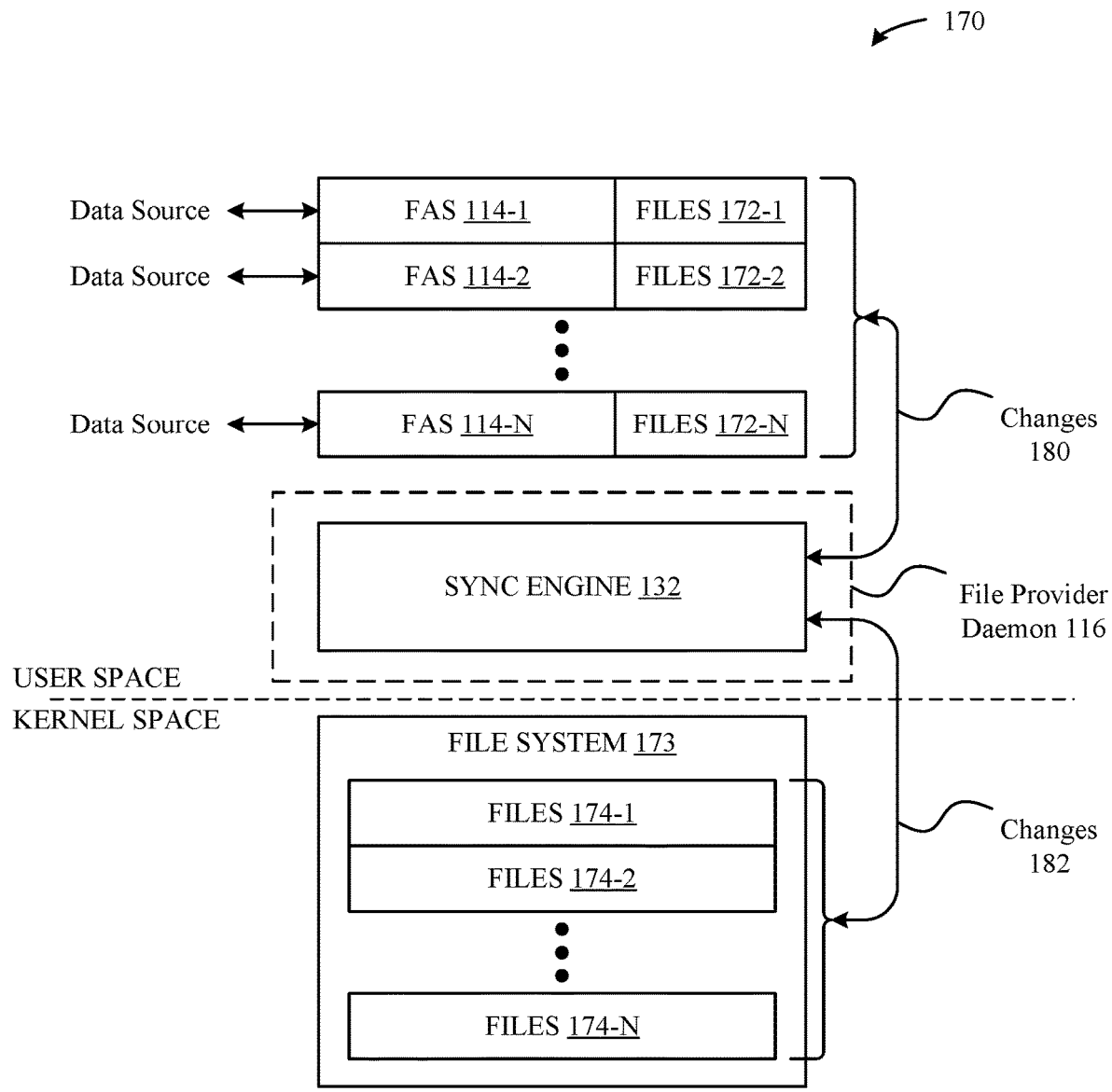
FIG. 1D illustrates a detailed overview of a synchronization engine that can be implemented on the computing device of FIG. 1A, according to some embodiments.

Additionally, FIG. 1D illustrates a detailed overview 170 of the synchronization engine 132 that can be implemented on the computing device 102 of FIG. 1A, according to some embodiments. As shown in FIG. 1D, the synchronization engine 132 can be configured to provide a synchronization layer between files 172 that are managed by the file access services 114 (in user space) and files 174 that are managed on a file system 173 (in kernel space). In an example scenario, the synchronization engine 132 can receive a request—e.g., from an application 110 or other process executing on the computing device 102—to download one or more files 172 managed by a given file access service 114. In turn, the synchronization engine 132 can provide the request to the file access service 114, where, in turn, the file access service 114 obtains the one or more files 172 from a data source accessible to the file access service 114. Next, the synchronization engine 132 can establish/update corresponding files 174 within the file system 173 (using the various techniques set forth herein).

Moving forward, the synchronization engine 132 is responsible for propagating changes between the files 172 and the files 174, regardless of where the changes occur. For example, if changes 180 to the files 172 occur at the data source associated with the file access service 114, then the file access service 114 can notify the synchronization engine 132 of the changes 180. In turn, the synchronization engine 132 can take the appropriate steps to update the files 174 where appropriate (using the various techniques set forth herein). In a converse example, if changes 182 to the files 174 occur at the file system 173, then the synchronization engine 132 can notify the file access service 114 of the changes 182. In turn the file access service 114 can interface with its associated data source to make the appropriate updates to reflect the changes.

Figure 1E:
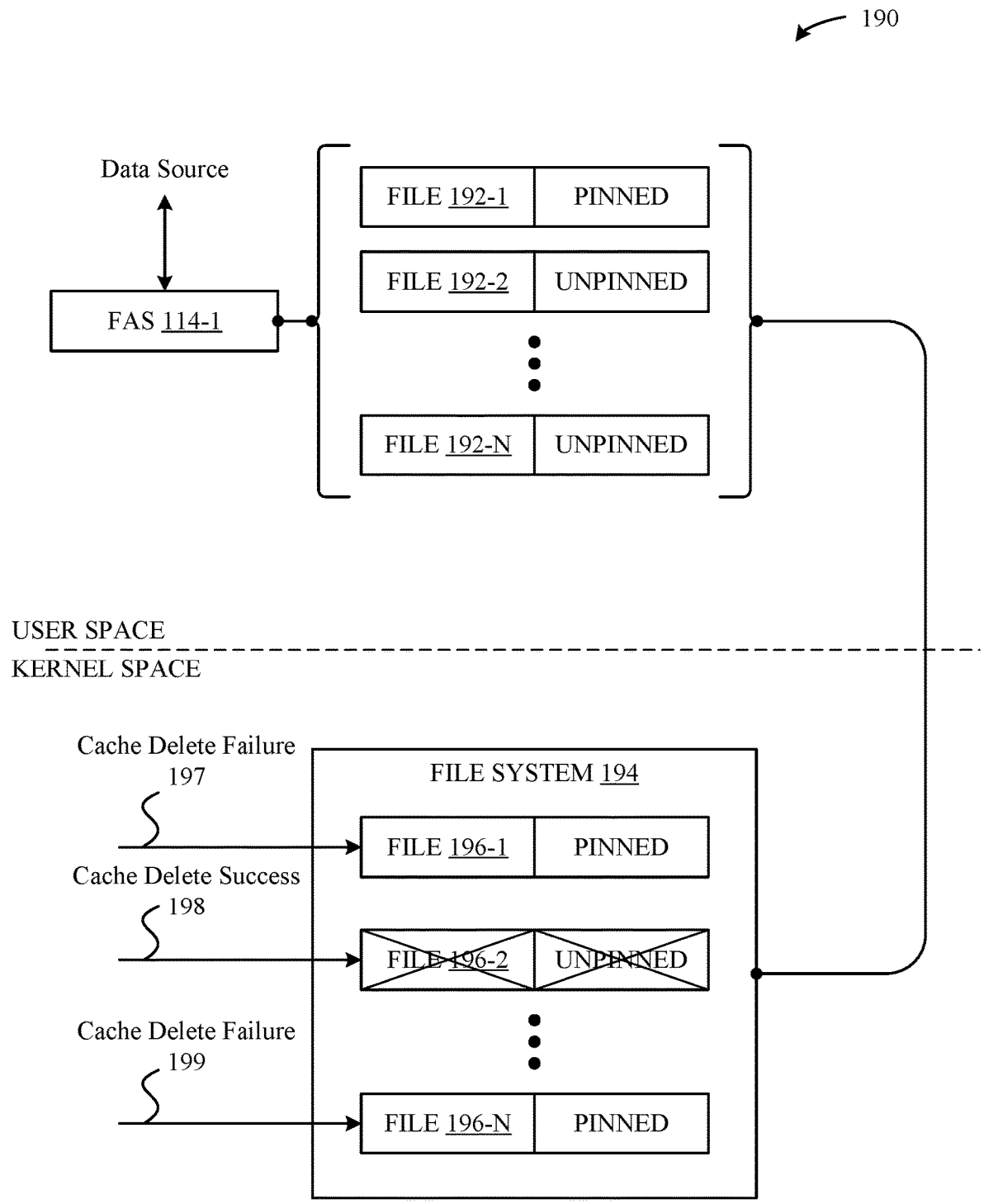
FIG. 1E illustrates a detailed overview of a pinning technique that can be implemented on the computing device of FIG. 1A, according to some embodiments.

Additionally, FIG. 1E illustrates a detailed overview 190 of a pinning technique that can be implemented on the computing device 102 of FIG. 1A, according to some embodiments. In particular, the term pinning refers to marking a file (or directory) to indicate that it should remain materialized on the computing device 102 even when the cache delete engine 117 is seeking to free up storage space. In the example scenario illustrated in FIG. 1E, the file access service 114-1 manages a collection of files 192, where each file is associated with a property that indicates whether the file should be pinned on the computing device 102. As described in conjunction with FIG. 1D, a corresponding set of files 196 can be managed within a file system 194 in the kernel space, where the pinning properties of each of the files 196 are reflected within the file system 194 in accordance with the pinning properties of the files 192 managed by the file access service 114-1.

In the scenario illustrated in FIG. 1E, when the cache delete engine 117 is seeking to delete one or more of the files 196 to free up storage space, the cache delete engine 117 will check the pinning properties of the one or more files 196 to determine whether they are eligible for deletion. For example, as shown in FIG. 1E, a cache delete failure 197 occurs when the cache delete engine 117 attempts to delete the file 196-1 after finding that it is a file that is marked as pinned. Conversely, a cache delete success 198 occurs when the cache delete engine 117 attempts to delete the file 196-2 because the file 196-2 is not marked as pinned. In an additional example, a cache delete failure 199 occurs when the cache delete engine 117 attempts to delete the file 196-N after finding that it is a file that is marked as pinned.

It is noted that the cache delete engine 117 can be configured to prompt a user of the computing device 102 when pinning properties of data stored within the file system 194 make it difficult for the cache delete engine 117 to free up enough storage space for a task that should execute, e.g., downloading a file that the user is seeking to access. For example, the prompt can indicate to the user which files have been marked as pinned, and give the user the option to unmark them so that they can be offloaded from the computing device 102 (while presumably being retained in other storage that is accessible to the file access services 114 that manage the pinned files).

Accordingly, FIGS. 1A-1E provide overviews of different hardware/software architectures that can be implemented by the computing device 102 in order to carry out the various techniques described herein. A more detailed breakdown of these techniques—which can be utilized to automatically materialize remote files in a local file system in response to system calls made to an operating system kernel—will now be provided below in conjunction with FIGS. 2-6.

Figure 2:
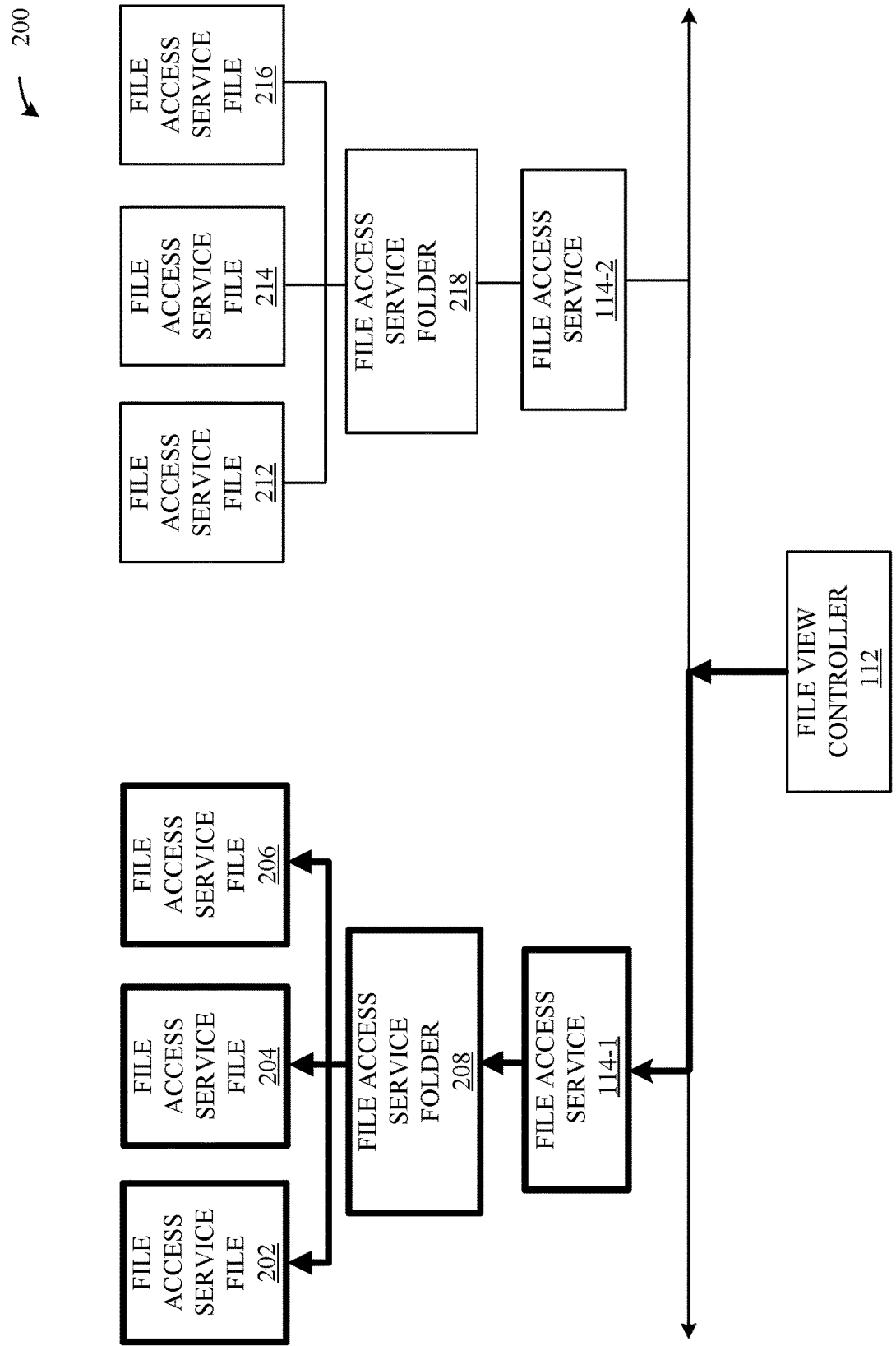
FIG. 2 illustrates exemplary file enumeration/synchronization procedures that can be performed to enable relevant files associated with a file system to be efficiently accessed, according to some embodiments.

FIG. 2 illustrates exemplary file enumeration/synchronization procedures 200 that can be performed to enable files associated with different file systems to be accessed, according to some embodiments. As shown in FIG. 2, a volume implemented in the non-volatile memory 120 of the computing device 102 can be formatted according to a particular file system and associated with an instance of the corresponding file access service 114. In accordance with the embodiment depicted in FIG. 2, a file access service 114 can provide access, via an application programming interface (API), to a file system resident on the computing device 102. The computing device 102 can implement multiple file systems therein, including multiple file systems on different storage devices, or even different volumes/partitions on the same storage device. In addition, the OS 108 of the computing device 102 can mount volumes associated with remote file systems such as the NFS or other file systems associated with cloud-based storage services.

As depicted in FIG. 2, the file access service 114-1 can include a file access service folder 208 (e.g., a directory) that includes file access service files 202, 204, and 206. The file access service 114-1 can be associated with a first file system, such as APFS, HFS+, or any other file system. It will be appreciated that the file access service 114-1 can implement a directory hierarchy including multiple directories at two or more levels of the directory hierarchy. Each directory can include zero or more files and/or zero or more child directories.

As illustrated by the enumeration procedures 200, the file view controller 112 can access a particular file access service 114 to request enumeration of the files and/or directories in a particular path of the directory hierarchy. The file view controller 112 can receive a list of the files or directories included in a specific directory associated with the path and then display the contents of that directory in a user interface. According to some embodiments, the file view controller 112 can monitor user activity to determine when a user selects a file of interest from the file access service 114.

It will be appreciated that the file view controller 112 directs an enumeration request to a particular instance of the file access service 114 associated with the request. For example, the OS 108 can mount two different volumes associated with two different file systems. Enumeration requests associated with a first volume are directed to the first file access service 114-1 and enumeration requests associated with a second volume are directed to the second file access service 114-2. The second file access service 114-2 can implement a second file system. As depicted in FIG. 2, the file access service 114-2 can include a file access service folder 218 (e.g., a directory) that includes file access service files 212, 214, and 216. Again, it will be appreciated that the file access service 114-2 can implement a directory hierarchy including two or more directories and that the file access service folder 218, and files included in the file access service folder 218, are provided for illustration purposes.

Figure 3:
FIG. 3 illustrates an exemplary access control list that can be implemented by a file provider daemon, in accordance with some embodiments.

FIG. 3 illustrates access control lists 300 implemented by the file provider daemon 116 of FIG. 1A, in accordance with some embodiments. The file view controller 112 can communicate with file provider daemon 116 to perform further procedures. For example, according to some embodiments, the communications between file view controller 112 and file provider daemon 116 can include permission data (e.g., entitlement data) that can notify file provider daemon 116 that a given application 110 has the appropriate permissions to receive information associated with a selected file. In response, file provider daemon 116 can generate a corresponding entry within a table (e.g., the access control table 310 in FIG. 3) that allows file provider daemon 116 to keep track of the different files that the application 110 is permitted to access. In other embodiments, file provider daemon 116 can maintain and update the access control table 310 independently or using information received from applications or processes in addition to or in lieu of file view controller 112.

Consider, for example, a scenario in which the application 110 is a word processing application, and the files 202, 204, and 206 are word processing documents that can be opened/accessed by the word processing application. In this scenario, the file 202 can be a desired document that a user seeks to load into the word processing application for editing. Accordingly, file provider daemon 116 can generate an entry within access control table 310 that corresponds to the user selecting the file 202 in association with the application 110. For example, as depicted in access control table 310, the entry generated by file provider daemon 116 can include data that identifies a domain name of the application 110 (e.g., "com.domain.wordprocessing_app"). Additionally, the entry generated by file provider daemon 116 can also include information associated with the file access service 114-1 associated with file 202, "com.vendor.application." Furthermore, the entry generated by file provider daemon 116 can also include information associated with an item identifier that corresponds to the file 202 (e.g., item ID value of "15"). Upon storing the entry within access control table 310, file provider daemon 116 can establish credentials that the application 110 can utilize to ultimately access the file 202. In particular, using the entry stored within access control table 310, file provider daemon 116 can generate a token (for receipt by application 110) that enables application 110 to access only the file 202, which is described below in greater detail. Thus, the file provider daemon 116 restricts access to particular files only to those applications or processes that have permission to access the file.

FIG. 4 illustrates coordination procedures 400 to facilitate file access by multiple clients, in accordance with some embodiments. In some cases, an application 110 may attempt to access a file 202 stored in a local file system. Prior to the receipt of access to file 202, the application 110 can engage in cooperative communications with the file coordination daemon 118 (and other applications when appropriate) such that the application 110 can receive a most recent version of file 202. By engaging in cooperative communications in this manner, each application 110 that seeks access to the file 202 can receive a version of the file 202 that includes any modifications that were previously made to the file 202 (e.g., modifications involving write operations performed on the file 202) prior to receipt.

According to some embodiments, the file coordination daemon 118 can engage in direct communications with the application 110 to provide the application 110 with access to an updated version of the file 202. For instance, upon receipt of a coordination message 402 from the application 110, the file coordination daemon 118 can perform validation procedures (e.g., using sandbox procedures) to determine whether the application 110 is authorized to access the file 202. The file coordination daemon 118 can communicate with the file provider daemon 116 in order to perform the validation procedures by, for example, utilizing the access control table 310 to determine whether application 110 is granted permissions to access the file 202.

Although not explicitly depicted in FIG. 4, the file coordination daemon 118 can, as a continuation of the examples described above herein, receive data from the file provider daemon 116 that includes a set of information associated with the file access service 114-1, which can provide access to the file 202 to the application 110. The set of information can include files located under a base URL associated with the file access service 114-1. In this fashion, the file coordination daemon 118 can recognize that the file 202 is an item that falls under a base URL associated with the file access service 114-1. Accordingly, the file coordination daemon 118 can provide the application 110 with secure access to the file 202 in response to the file coordination daemon 118 receiving the coordination message 402 from the application 110. In this fashion, the application 110 can receive read/write privileges to modify the file 202. Moreover, the file access service 114-1 can also receive proper notification of any modifications made by the application 110 to the file 202 while it maintains read/write privileges to modify the file 202.

In cases where the file 202 is materialized in the local file system, the application 110 can use the credentials to access the file 202 using a system calls to the OS 108 kernel. As depicted in FIG. 4 and in accordance with some embodiments, the application issues a system call 404 in user space, which is directed to a virtual file system 410 layer of the OS 108 kernel. According to some embodiments, the virtual file system 410 is an abstraction layer that exists on top of a more concrete file system 420 layer within the OS 108 kernel. In some embodiments, the virtual file system 410 layer can be omitted, and the system call 404 can be associated with the file system 420 layer directly. In other words, the virtual file system 410 layer implements an interface that provides for system calls in user space applications that are processed by the OS 108 kernel. The virtual file system 410 layer implements the interface as generic system calls that can be implemented in different manners for multiple file system 420 layers.

In some embodiments, the virtual file system 410 layer can implement various system calls that are used by user space applications to access the files stored in the non-volatile memory 120. For example, system calls can include: open( ), read( ), write( ), stat( ), mmap( ), readdir( ), getattrlistbulk( ), truncate( ), sendfile( ), and the like as defined by the interface implemented by the virtual file system 410 layer. The file system 420 layer interfaces with the I/O layer and device drivers for the physical storage medium (not explicitly shown in FIG. 4) to access the file 202.

In some cases, a file may not be materialized within the file system. Issuing a system call for a file that is not materialized would result in a processing error or failure within the OS 108 kernel, and, more specifically, within the file system 420 layer of the OS 108 kernel. However, when file coordination daemon 118 receives the coordination message 402, the file coordination daemon 118 will attempt to materialize the file prior to the application 110 accessing the file using system calls to the OS 108 kernel.

In some embodiments, a file access service 114 for a third-party file provider associated with a cloud-based storage service is configured to generate placeholder files—also referred to herein as dataless faults—in the file system to indicate the file is located on a remote server device. According to some embodiments, the placeholder files are empty (e.g., the file includes no data). However, metadata for the placeholder files can exist within the file system, and, in some embodiments, can include various attributes such as, but not limited to, identifying the file type as a dataless fault, identifying the type of file stored on the remote server device, or indicating a size of the file stored on the remote server device. Because the placeholder file with associated metadata exists locally, certain file access operations (e.g., stat( ), open( ), etc.) that do not require access to the data can be completed successfully without having to first download the data included in the remote file.

For example, a placeholder file 204 can be generated by the file access service 114-1 as a dataless fault to represent a remote file stored in a non-volatile memory included in a server device. Application 110 can send coordination message 402 to the file coordination daemon 118 to attempt to access file 204. The file coordination daemon 118, in coordination with the file provider daemon 116, retrieves credentials that application 110 can use to access the file 204 in the local file system even though file 204 does not contain any data at this point in time.

In some embodiments, the placeholder files are generated in response to an enumeration procedure executed by the file access service 114. For example, the file access service 114 can be associated with a volume mounted by the OS 108. The file view controller 112 or the application 110 can request the file access service 114 to enumerate the files or directories included in a root directory of the volume. A placeholder file is then created in the local file system for each directory or file found in the root folder, but the data included in the files or directories in the root folder will not be downloaded until an application attempts to access those files or directories for the first time. Entries in the access control table 310 for the placeholder files can be created during the enumeration procedure as well.

The coordination message 402 indicates to the file coordination daemon 118 that the application 110 is going to access the file 204 and is requesting that the file 204 be synchronized in the local file system. The file coordination daemon 118 ensures that the state of the file 204 in the local file system is the most recent state as modified by any other devices with access to the file on the remote server device. The file coordination daemon 118 can also help ensure that modifications to the file 204 are propagated to other applications that may be attempting to access the file simultaneously.

In some cases, in response to the coordination message 402, the file coordination daemon 118 generates a cross-process communication (XPC) call to the file provider daemon 116. In some embodiments, the XPC call can include a user identifier associated with the file 204 such that the file provider daemon 116 can invoke the correct instance of the file access service 114 to materialize the file 204.

In some embodiments, the OS 108 implements a kernel architecture that utilizes inter-process communication techniques to transfer data between processes. Each process can implement ports, which are protected message queues, for communication between tasks. Messages are sent between ports from one task to another task. As used herein, a task is an object that includes a set of resources for executing one or more threads. Threads within a task can share resources with other threads within the task but are isolated from threads in other tasks. Consequently, tasks communicate by sending messages to a specific port of a target task. For example, the XNU kernel, included in the Apple® iOS and MacOS operating systems, utilizes MACH for inter-process communications (IPC).

As used herein, XPC refers to a specific type of implementation of inter-process communications that utilizes a central dispatcher to route messages between tasks. XPC enables messages to be broadcast or multicast to multiple tasks configured as listeners rather than requiring direct linking of messages between tasks using known ports. The file coordination daemon 118 utilizes XPC calls because, in some embodiments, the file provider daemon 116 is implemented as a service that utilizes an XPC API. However, it will be appreciated that the file provider daemon 116 can be implemented to utilize other types of IPC other than the XPC API. In such cases, the file coordination daemon 118 generates a message in accordance with the IPC interface implemented by the file provider daemon 116.

The file provider daemon 116, in response to the XPC call, invokes a particular file access service 114 associated with the file 204. Again, the computing device 102 can implement multiple file access services 114 associated with different volumes, each volume potentially associated with a different file system. The file provider daemon 116 is configured to select the correct file access service 114 based on the information included in the XPC call, which can be passed to the file coordination daemon 118 in the coordination message 402.

The file access service 114 determines whether the file 204 is currently being downloaded. If the file 204 is currently being downloaded, then the thread for the application 110 is blocked until the download completes. Otherwise, the file access service 114 causes the remote file to be downloaded from the server device. When the remote file has been downloaded, the file access service 114 provides a handle to the file to the file provider daemon 116. The file provider daemon 116 then materializes the file 204 by copying the downloaded data into the placeholder file 204 in the local file system.

It will be appreciated that when the file provider daemon 116 copies the downloaded data into the file 204, the file provider daemon 116 also updates the metadata for the file 204. For example, the metadata can be updated to identify the file as a particular file type (e.g., document, image, etc.) along with other metadata associated with the file (e.g., date of creation, size in bytes, owner of the file, etc.). The file provider daemon 116 then uses a callback function to indicate to the file coordination daemon 118 that the file 204 is available.

When the file 204 has been materialized by the file coordination daemon 118, the application 110 can access the file using system calls to the OS 108 kernel, like any other file in the local file system. However, there is no mechanism that forces applications to utilize the file coordination daemon 118 to ensure that files associated with a cloud-based storage service are materialized in the local file system. Consequently, if an application were to issue a system call for a file 204 that was not yet materialized in the local file system, the file system 420 layer of the OS 108 would generate a fault that blocks the thread issuing the system call. This issue is solved by using the fault handler invoked to call the file coordination daemon 118 in order to materialize the file 204.

In some embodiments, the application 110 issues a system call 404 to the virtual file system 410 layer requesting access to the file 204. The virtual file system 410 layer calls a corresponding interface in the file system 420 layer. In response to system calls, like stat( ) or open( ), the file system 420 layer can process the system call associated with the placeholder file 204 because the procedure may only require access to the metadata or access to the file location in the non-volatile memory 120. However, other system calls can fail at the file system 420 layer due to the lack of data in the placeholder file 204. This failure generates a fault within the file system 420 layer of the OS 108 kernel. The file system 420 layer will invoke a namespace handler associated with the fault. In some embodiments, the type of fault generated by the file system 420 layer is a dataless fault that indicates the file associated with the system call is empty. Threads issuing system calls that generate one of these faults will block in the file system 420 layer.

In some embodiments, the namespace handler is configured to interface with the file coordination daemon 118 in order to perform synchronization procedures to materialize the file 204 in the local file system. The synchronization procedure is configured to copy the data from the file stored on the remote server device into the placeholder file 204 in the local file system. The namespace handler can implement IPC to cause the file coordination daemon 118 to invoke the synchronization procedure.

In some embodiments, the namespace handler includes a MACH interface generator (MIG) that generates remote procedure calls (RPCs) that are passed between processes using MACH messages. Consequently, the namespace handler, responsive to being invoked by the file system 420 layer of the OS 108 kernel, generates an RPC for the file coordination daemon 118. The file coordination daemon 118 receives the RPC through the MACH interface. The thread that generated the system call blocks in the OS 108 kernel and waits for the file coordination daemon 118 to materialize the file 204. The file coordination daemon 118 materializes the file as discussed above using an XPC call to the file provider daemon 116 to cause the file provider daemon 116 to invoke the correct instance of the file access service 114 to materialize the file 204.

As discussed above, techniques have been implemented by third-party file providers that enable lazy materialization of files on the local file system. These techniques include use of a kernel extension to intercept the system call 404 prior to the system call 404 being processed by the file system 420 layer, thereby avoiding the generation of the fault. The proposed solutions described herein remove the requirement for a third-party file provider to create a kernel extension to intercept the system calls and instead provide a mechanism whereby a user space application (e.g., the file access service 114) can generate placeholder files in the local file system that are materialized automatically using a fault handler associated with the OS 108 kernel.

In some embodiments, the file provider daemon 116 and/or the file coordination daemon 118 translate the dataless fault into a particular POSIX compliant error number. For example, the POSIX error number should be capable of distinguishing between failures due to authentication errors (e.g., credentials supplied to the cloud-based service are incorrect), network errors (e.g., server unavailable), and synchronization timing errors (e.g., remote file unavailable on the server). The POSIX compliant error numbers enable the application 110 to properly respond to a failure to materialize the file 204 in the case of a timeout. The application 110 should be able to provide the user with a relevant error number or error description so the user can adjust accordingly. For example, the user should be able to tell whether the file was not found on the server or whether the server is unreachable due to, for example, a network connectivity issue. Without translating the dataless fault into a corresponding POSIX compliant error number, the application 110 would not be able to distinguish between different failure modes.

In some embodiments, the dataless fault can be translated into an ESTALE error number when the file cannot be materialized due to the file not existing on the remote server device. Alternatively, the dataless fault can be translated into an ETIMEDOUT error number indicating that the file is unavailable after waiting for a specified timeout period.

In some embodiments, the OS 108 kernel can implement a UI element, such as a dialog box or other graphical user interface (GUI) element that provides an indication to a user that a thread or application is blocked in the OS 108 kernel while waiting for a file to be materialized in the local file system. For example, the GUI element can include a progress bar that indicates the percentage of the file that has been downloaded from a remote server device. This will let the user know that a synchronization process is currently ongoing rather than simply relying on a user to infer that the process is stalled because a remote file is being accessed by the application 110. In some cases, the GUI element should include a button or other mechanism that allows the user to cancel the synchronization procedure and return the system call without materializing the file in the local file system.

Figure 5:
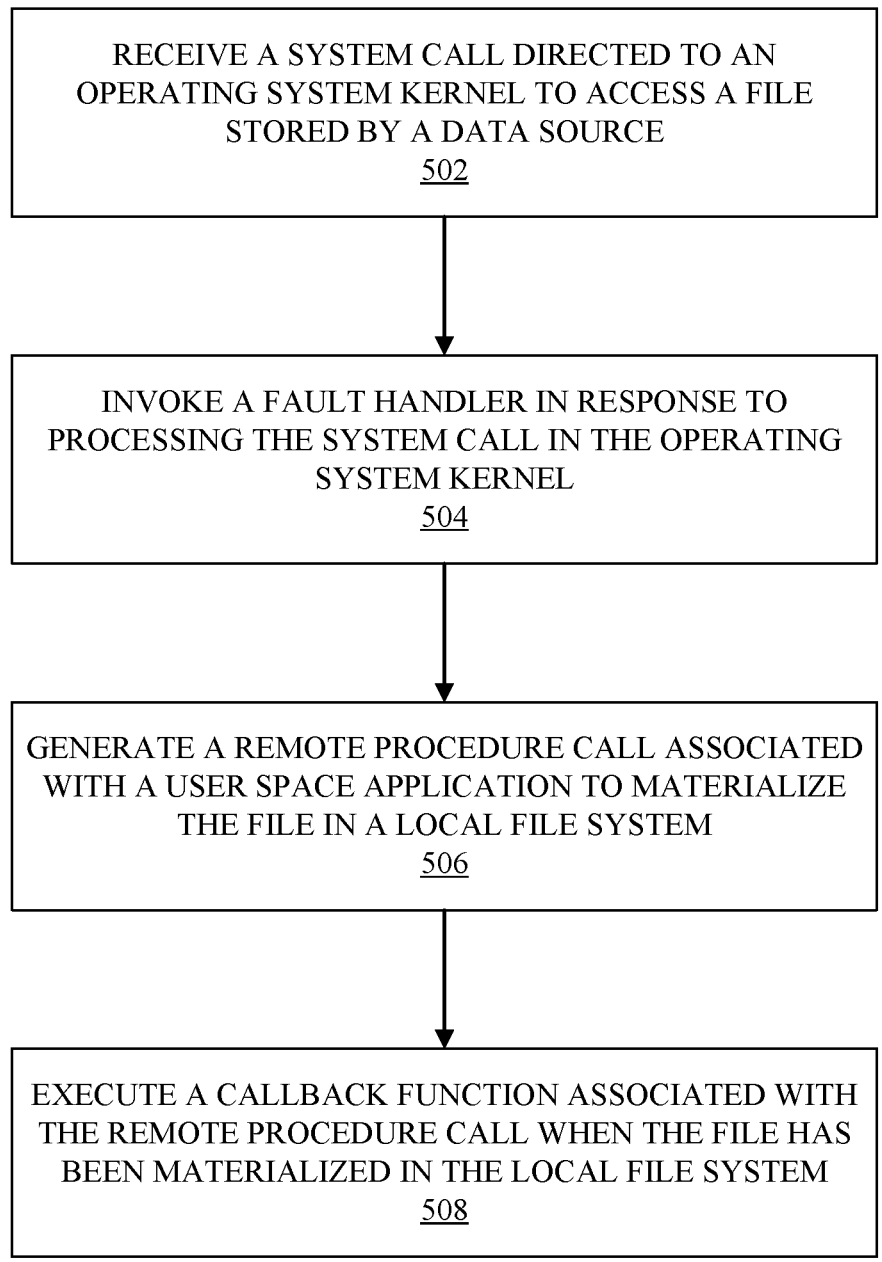
FIG. 5 illustrates a method for enabling a software application to access files at a computing device while enforcing privacy measures, in accordance with some embodiments.

FIG. 5 illustrates a method 500 for enabling a software application to access files at a computing device while enforcing privacy measures, in accordance with some embodiments. The method 500 can be implemented by hardware or software, or any combination thereof. In some embodiments, the method 500 is implemented by a processor 104 of the computing device 102 executing, at least in part, the application 110, the file view controller 112, the file provider daemon 116, the file access services 114, and the file coordination daemon 118 in cooperation with the OS 108.

At 502, a system call is received by a kernel of an operating system executed by a processor of a computing device. The system call requests access to a file stored on a remote server device and not materialized within a local file system of the computing device. In some embodiments, the file is stored in the local file system as a placeholder file that indicates that the data for the file is stored remotely.

At 504, the operating system kernel invokes a fault handler in response to a dataless fault generated at the file system layer of the kernel. At 506, a namespace handler generates a remote procedure call (RPC) for a user space application to request that the file is materialized in the local file system. In some embodiments, the namespace handler includes a MACH interface generator that is configured to generate the RPC to the file coordination daemon. In some embodiments, the RPC causes the file coordination daemon, in coordination with the file provider daemon and a particular instance of a file access server, to request the file from the remote server device. The data for the file is copied into the placeholder file in the local file system and the metadata for the placeholder file is updated to reflect that the file is materialized in the local file system.

At 508, a callback function is executed when the file has been materialized in the local file system. The callback function can be executed by the file coordination daemon when the placeholder file 204 has been materialized and the data for the remote file has been synchronized into a local copy of the file in the local file system. The callback function can enable the namespace handler to unblock the thread in the file system layer of the kernel.

It will be appreciated that, in alternative embodiments, the functionality of the file coordination daemon, the file provider daemon, and the file access service(s) can be implemented in a single application or service executing on the computing device. Alternatively, two or more processes having different architecture than the file coordination daemon, the file provider daemon, and the file access service(s) can be implemented to perform the method 500.

FIG. 6 illustrates a detailed view of a computing device 600 that can be used to implement the various components described herein, according to some embodiments. In particular, the detailed view illustrates various components that can be included in the computing device 102 illustrated in FIG. 1A. As shown in FIG. 6, the computing device 600 can include a processor 602 that represents a microprocessor or controller for controlling the overall operation of the computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, and so on. Still further, the computing device 600 can include a display 610 that can be controlled by the processor 602 to display information to the user. A data bus 616 can facilitate data transfer between at least a storage device 640, the processor 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include a wireless transceiver.

As noted above, the computing device 600 also include the storage device 640, which can comprise a single disk or a collection of disks (e.g., hard drives), and includes a storage management module that manages one or more partitions within the storage device 640. In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of applications executing on the computing device 102, including applications 110, a file view controller 112, a file provider daemon 116, file access services 114, and a file coordination daemon 118.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling applications to access files at a computing device, the method comprising:
   within a kernel space on the computing device:
      receiving, from an application executing within a user space on the computing device, a system call to access a file stored on a remote server device,
      invoking a fault handler in response to processing the system call, and
      executing a remote procedure call (RPC) directed to the user space, wherein the RPC causes the file to be materialized within a local file system implemented on the computing device; and
   within the user space on the computing device:
      in response to determining that the file is materialized within the local file system:
         executing a callback function associated with the RPC to release the fault handler.

2. The method of claim 1, wherein, prior to receiving the system call, the file is not materialized within the local file system.

3. The method of claim 2, wherein the file is implemented as a placeholder file that indicates data for the file is stored on the remote server device.

4. The method of claim 3, further comprising, prior to executing the callback function:
   obtaining the data for the file; and
   copying the data into the file.

5. The method of claim 1, wherein the RPC is generated by a namespace handler.

6. The method of claim 1, wherein:
   the RPC is directed to a file coordination daemon executing in the user space, and
   the file coordination daemon, in conjunction with a file provider daemon and a file access service, obtain the file from the remote server device and store the file into the local file system.

7. The method of claim 1, further comprising, subsequent to executing the callback function:
   updating a configuration of the local file system to enable the file to be accessed by the application.

8. At least one non-transitory computer readable storage medium configured to store instructions that, when executed by at least one processor included in a computing device, cause the computing device to enable applications to access files at the computing device, by carrying out steps that include:
   within a kernel space on the computing device:

receiving, from an application executing within a user space on the computing device, a system call to access a file stored on a remote server device, invoking a fault handler in response to processing the system call, and executing a remote procedure call (RPC) directed to the user space, wherein the RPC causes the file to be materialized within a local file system implemented on the computing device; and within the user space on the computing device:
in response to determining that the file is materialized within the local file system:
executing a callback function associated with the RPC to release the fault handler.

9. The at least one non-transitory computer readable storage medium of claim 8, wherein, prior to receiving the system call, the file is not materialized within the local file system.

10. The at least one non-transitory computer readable storage medium of claim 9, wherein the file is implemented as a placeholder file that indicates data for the file is stored on the remote server device.

11. The at least one non-transitory computer readable storage medium of claim 10, wherein the steps further include, prior to executing the callback function:
obtaining the data for the file; and
copying the data into the file.

12. The at least one non-transitory computer readable storage medium of claim 8, wherein the RPC is generated by a namespace handler.

13. The at least one non-transitory computer readable storage medium of claim 8, wherein:
the RPC is directed to a file coordination daemon executing in the user space, and
the file coordination daemon, in conjunction with a file provider daemon and a file access service, obtain the file from the remote server device and store the file into the local file system.

14. The at least one non-transitory computer readable storage medium of claim 8, wherein the steps further include, subsequent to executing the callback function:
updating a configuration of the local file system to enable the file to be accessed by the application.

15. A computing device configured to enable applications to access files at the computing device, the computing device comprising:
at least one processor; and
at least one memory storing instructions that, when executed by the at least one processor, cause the computing device to:
within a kernel space on the computing device:
receive, from an application executing within a user space on the computing device, a system call to access a file stored on a remote server device,
invoke a fault handler in response to processing the system call, and
execute a remote procedure call (RPC) directed to the user space, wherein the RPC causes the file to be materialized within a local file system implemented on the computing device; and
within the user space on the computing device:
in response to determining that the file is materialized within the local file system:
execute a callback function associated with the RPC to release the fault handler.

16. The computing device of claim 15, wherein, prior to receiving the system call, the file is not materialized within the local file system.

17. The computing device of claim 16, wherein the file is implemented as a placeholder file that indicates data for the file is stored on the remote server device.

18. The computing device of claim 17, wherein the at least one processor further causes the computing device to, prior to executing the callback function:
obtain the data for the file; and
copy the data into the file.

19. The computing device of claim 15, wherein the at least one processor further causes the computing device to, subsequent to executing the callback function:
update a configuration of the local file system to enable the file to be accessed by the application.

20. The computing device of claim 15, wherein the RPC is generated by a namespace handler.

* * * * *